May 13, 1969 P. J. THOMPSON 3,443,453
COUPLING
Filed Oct. 16, 1967 Sheet 3 of 3
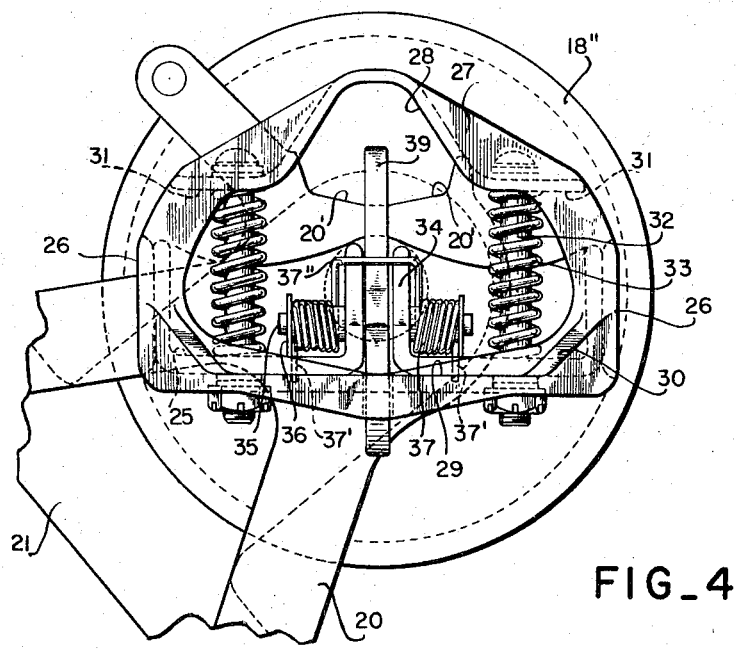
FIG_4
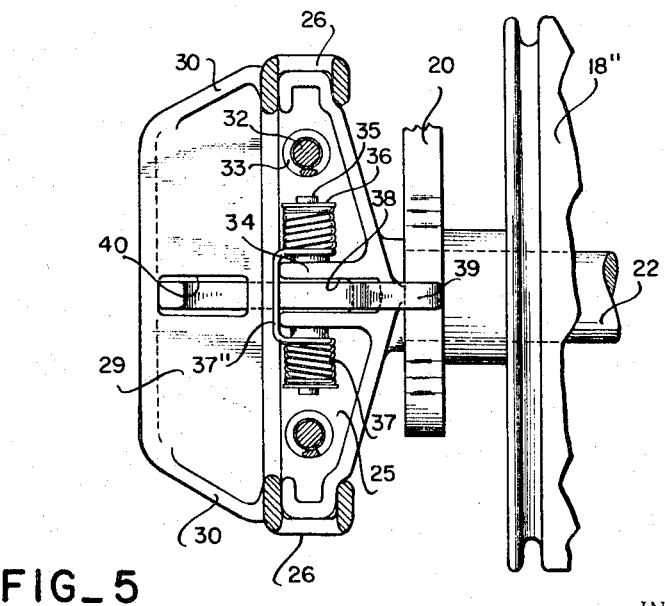
FIG_5
INVENTOR.
PERRY J. THOMPSON
BY
*George C. Sullivan*
Agent

United States Patent Office 3,443,453
Patented May 13, 1969

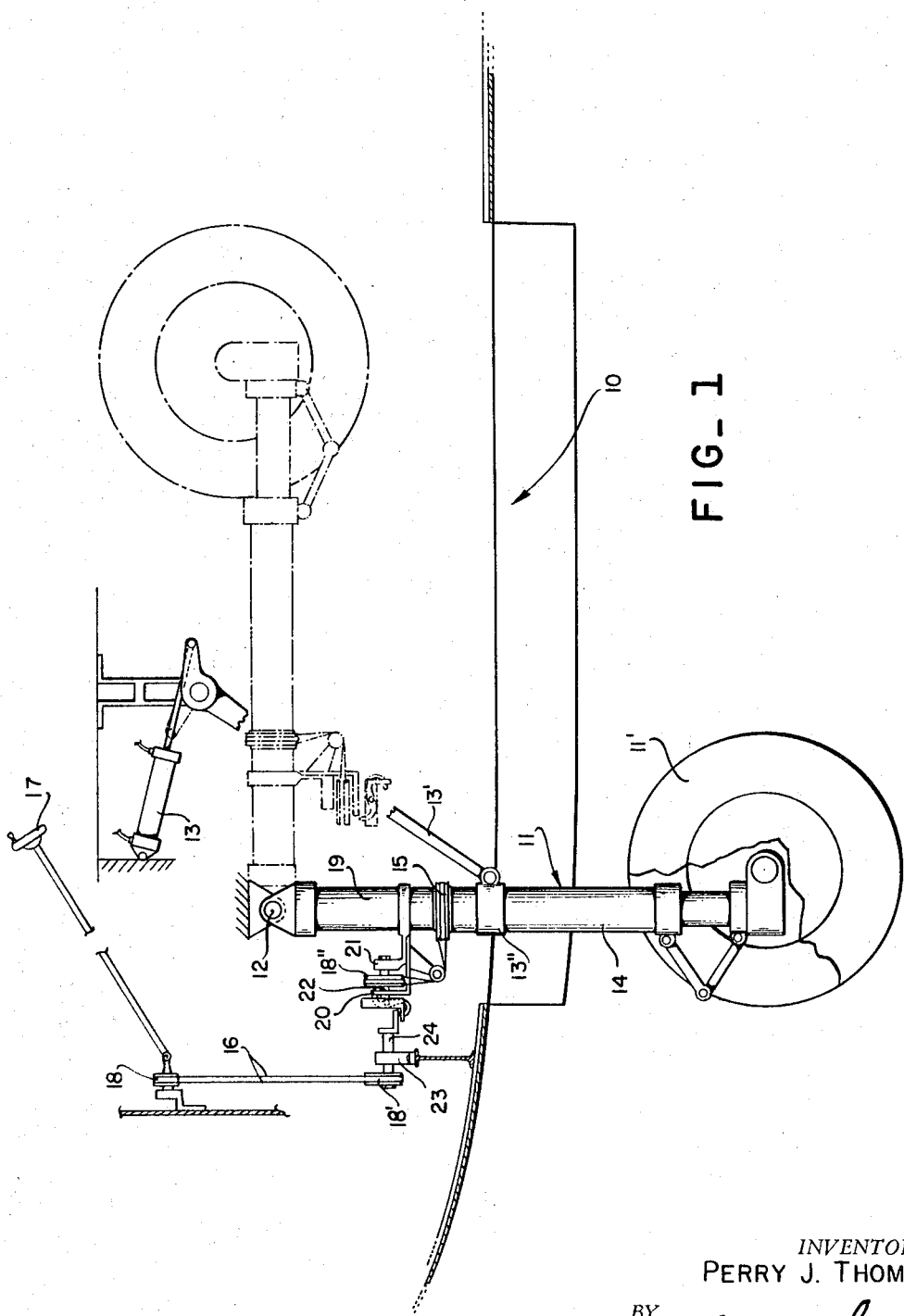
FIG_1
INVENTOR.
PERRY J. THOMPSON

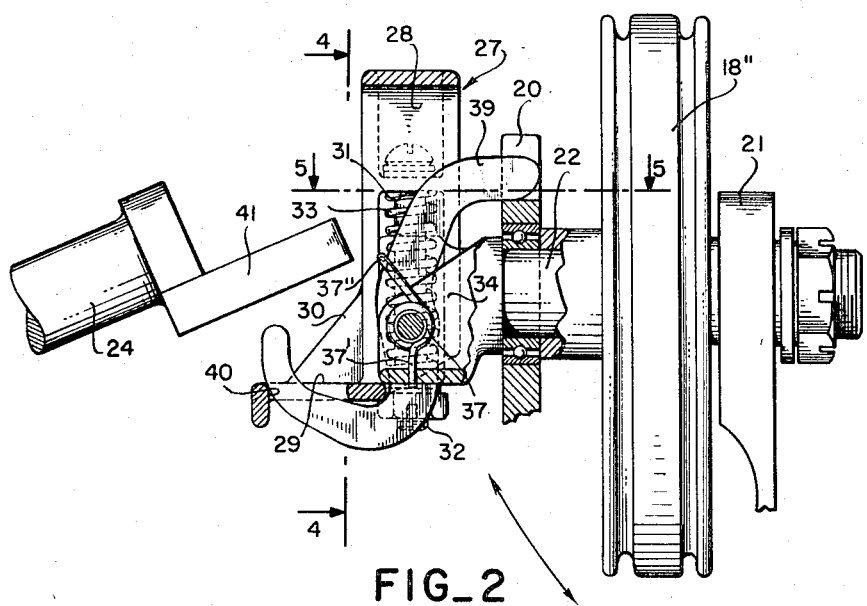
FIG_2
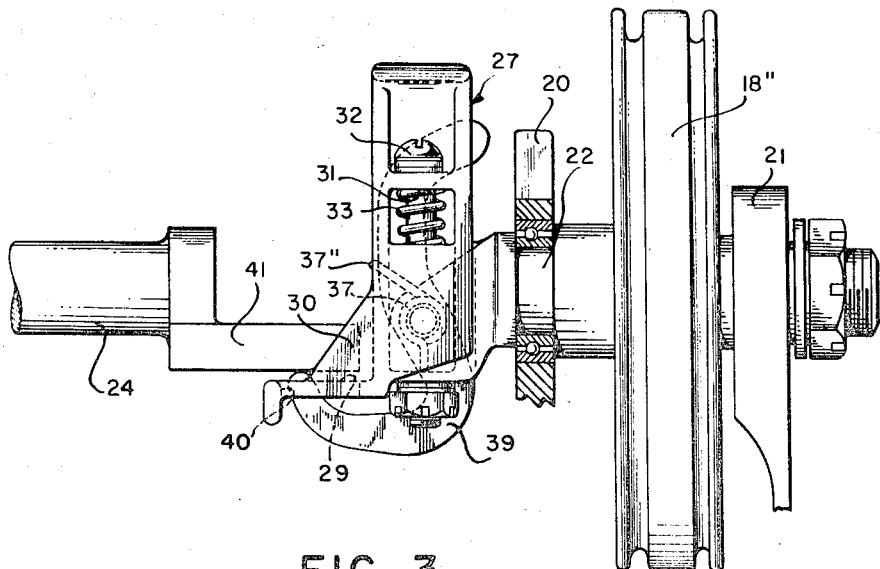
FIG_3

3,443,453
COUPLING
Perry J. Thompson, Marietta, Ga., assignor to Lockheed
Aircraft Corporation, Burbank, Calif.
Filed Oct. 16, 1967, Ser. No. 675,591
Int. Cl. G05g *1/08;* B64c *25/50*
U.S. Cl. 74—510
5 Claims

ABSTRACT OF THE DISCLOSURE

This coupling transmits torque through an offset joint between two shafts. A spring-loaded member assures contact between the end surfaces of the shafts and compensates for misalignment as well as overengagement and underengagement during coupling and/or uncoupling. An independent feature is an automatic lock and self-centering device which primarily limits uncoupled rotation and secondarily centers the shaft. A locking device on each shaft will assure proper coupling when the shafts are brought back together. The spring loaded centering function can be overridden without damage to the torque shaft coupling.

---

This invention relates generally to couplings and more particularly to shaft couplings adapted to automatically engage and release upon relative movement of their respective shafts to and from each other. The invention is characterized by improvements in the construction and arrangement of a coupling by which the driven shaft is releasably engaged by the drive shaft within set limits and yet capable of appreciable overengagement and axial misalignment without imparting undue backlash on the drive shaft. Special provisions are included as a part of the coupling assembly, to radially position the shafts in a predetermined relative location upon disengagement of the shafts by release of the coupling.

While having general utility and application, the present coupling is especially designed for use in the linkage train of the steering system of aircraft. In this particular application, a make-and-break connection is required between the drive and driven shafts in the system located between the pilot's steering wheel or stick and the remote landing surface contacting element, such as for example a wheel or wheels, in order to permit retraction of such element or gear during flight of the aircraft. Manifestly, reliability of the make-and-break function is of paramount importance. Such reliability is not readily assured where axial alignment of the rotary shafts is involved when in the engaged position with virtually no relative lateral movement or play. Also virtually no backlash or transverse loads can be tolerated in such a linkage system.

Moreover, prepositioning of both the landing gear element or wheel and the steering wheel when the aircraft is airborne is important. Since common linkage is usually employed between the landing or ground contacting element and the external control surfaces of the aircraft, it is desirable that the steering wheel be located in a center or null position for flight. Also, location of the wheel in a true fore and aft position at the time of contact with the ground or runway is important to safety as well as in establishing a reference or index position to assure engagement of the shafts when the gear is protracted or extended. To eliminate the human error element, this is preferably accomplished automatically with and in response to the disengagement operation of the shafts.

These fundamental problems are compounded by the further requirements with respect to size, weight, etc., invariably present in aircraft applications. Thus, limited space areas within the aircraft are available for such devices and the location of such an area for the instant coupling is further restricted due to a comparatively fixed path of movement of the landing gear to and from the retracted and protracted positions.

More specifically, the coupling herein proposed includes an engagement element resiliently mounted on and carried by one of the shafts and formed or otherwise provided with a surface complemental to a mating surface carried by the other shaft, whereby axial rotation of either shaft is transmitted to the other shaft. Additionally, the shafts are mounted for relative pivotal or swinging movement with respect to each other and relative lateral movement of their respective mating surfaces out of engagement. A trigger biased to a predetermined position carried by at least one of the shafts and disposed in the path of movement of the other shaft is tripped thereby during the disengagement operation and contacts a cam surface carried by its shaft. Such shaft is thereby forcibly moved under the biasing force of the trigger to a predetermined position corresponding to a desired reference or null position of an associated part, such as for example a drive or driven wheel, connected to the shaft.

With the above and other objects in view as will be apparent, this invention consists in the construction, arrangement and combination of parts all as hereinafter more fully described, claimed, and illustrated in the accompanying drawings wherein:

FIGURE 1 is a schematic view of the essentials of a typical nose gear steering system of an aircraft illustrating the two extreme positions of protraction and retraction (in broken lines) of the ground wheel to show generally a coupling as herein proposed operatively associated therewith in the engaged and disengaged positions respectively;

FIGURE 2 is a side elevation of the coupling illustrated generally in FIGURE 1 at a larger scale and with parts broken away to show its connection to one of the shafts and its relation with respect to the other shaft when in the disengaged position whereby its trigger or indexing means engages the cam surface carried by the shaft to which it is connected to locate such shaft in a predetermined radial position;

FIGURE 3 is a similar view with the shafts engaged whereby the trigger is overpowered and retained in an inoperative position out of engagement with the cam surface of the associated shaft;

FIGURE 4 is a view taken along the line 4—4 of FIGURE 2; and

FIGURE 5 is a view taken along the line 5—5 of FIGURE 2.

Referring more specifically to the drawing, 10 designates a portion of the underside of an aircraft in which a landing gear 11 is mounted following typical practice. This gear 11 is adapted for extension (illustrated in solid lines in FIGURE 1) and retraction (in broken lines in FIGURE 1) about a pivot 12 through the operation of an actuator 13, all mounted and secured to fixed structure internally of the aircraft 10. The actuator 13 is pivotally connected to the gear 11 through a link 13' and freely rotatable collar 13".

In order to accomplish the controlled movement or steering of the wheel or wheels 11' of the gear 11, the upper end of the lower strut member 14 carries a collar 15 to which the ends of a pair of cables 16 are secured. These cables 16 are connected in appropriate manner at their opposite ends to a steering wheel 17 located within the cabin or cockpit of the aircraft 10. Intermediate pulleys and/or sprocket chain connections 18 are suitably mounted to fixed aircraft structure along the length of the cables 16 whereby a linkage train is established to transmit movement of the steering wheel 17 to the ground or nose wheel 11'. The several pulleys 18 thus serve to maintain the direction and course of the cables 16 in this train without restricting the linear movement thereof whereby the wheel 11' is rotated about the axis of the strut 14.

Since the gear 11 is retractable, it is desirable to make and break connection in the linkage train. This is accomplished by mounting one of the pulleys 18'' on the upper strut member 19 and another pulley 18' on fixed aircraft structure near to the gear 11 when in the extended or protracted position so that the pulleys 18' and 18'' are coaxially aligned on their respective shafts. To this end, a pair of spaced, supporting brackets 20 and 21 are secured to the upper member 19 and the landing gear strut 11 to project therefrom and rotatably mount a shaft 22 therein on which the pulley 18'' is carried. A similar bearing bracket 23 projecting from fixed aircraft structure rotatably mounts another shaft 24 on which the pulley 18' is carried. Thus mounted the shafts 22 and 24 are disposed about a common axis of rotation and with their adjacent ends between the bearings 20 and 23 when the gear 11 is in the protracted position.

One of the shafts, for example the shaft 22 carried by the landing gear strut 11, terminates in an offset, relatively wide and laterally disposed base plate 25 having outer end walls which conform to and slidingly coact with channel-like walls 26 of a yoke 27 which is thereby movable to a limited degree in a lateral plane relative to and on the shaft 22. This yoke 27 completely encircles the plate 25, however, is open centrally, as at 28, and is formed or otherwise provided at its edge with an extension plate 29 adjacent and projecting away from the base plate 25. For reasons to become more apparent, the extension 29 is strengthened by side webs or gussets 30 integrally connecting it to the main portion of the yoke 27.

At its other end, i.e., the end opposite the extension 29, the yoke 27 is formed or otherwise provided adjacent each side with a wall 31 disposed parallel to the base plate 25. A hole pierces each of these walls 31 in alignment with a similar hole in the base plate 25 to receive a bolt and nut assembly 32 acting as a retainer and guide for a compression spring 33 mounted thereon. The springs 33 thus act on and against the yoke 27 and base plate 25 in opposite directions to constantly urge them apart.

At the center of the base plate 25 the shaft 22 terminates in a clevis 34 pierced by a transverse hole through which a pin 35 passes. At its opposite, outer ends the pin 35 is grooved or otherwise formed to receive a retaining ring 36, such rings 36 coacting one with the other and with suitable spacing means to locate and maintain the pin 35 and torque spring 37 thereon in a fixed position with respect to the clevis 34. The space thus established between each ring 36 and the clevis 34 accommodates the opposite end portions of a torque spring 37, anchored as at 37' to the base plate 25, the central portion 37'' thereof being adapted to extend around or straddle the clevis 34.

The base plate 25 is pierced by a slot 38 located between the arms of the clevis 34 and through which an S-shaped hook 39 passes. Medially of its length this hook 39 is pierced by a transverse opening by means of and through which it is mounted on the pin 35 and the central portion 37'' of the torque spring 37 passes eccentrically around the hook 39 so as to constantly urge its outer ends in opposite directions.

The end of the hook 39 that passes through the base plate 25 curves back towards itself and extends through a slot 40 provided in the yoke extension 29. At its opposite end the hook 39 is similarly formed and extends through the opening or cut-out 28 in the yoke 27 projecting toward and into the plane of the support bearing 20. The bearing 20 carries a cam surface produced by contouring its edge adjacent the extending end of the hook 39 with sloped surfaces 20' that meet to form a trough. The surfaces 20' thereby act as ramps contacting the hook 39 acting under the influence of the torsion spring 37 to automatically force the hook 39 into the trough defined thereby and rotate the shaft 22 to a predetermined radial position disposing the wheel as required for most efficient stowage in the aircraft.

The other shaft 24 terminates in an offset 41 having an external surface 41' generally complemental to and adapted for coaction with the inner surface of the extension 29. With the offset 41 and extension 29 prepositioned "down" as shown in FIGURE 1, rotation of the gear 11 from the protracted to the retracted position by operation of the actuator 13 swings the extension 29 away from and out of contact with the coacting surface 41' of offset 41. At the same time this disengagement of offset 41 and extension 29 effects the release of the spring-loaded hook 39 so that it can act under the influence of its spring 37. It, therefore, moves into engagement with one of the ramp surfaces 20' on bearing 20 causing the automatic rotation of the shaft 22 to its null or predetermined position.

Rotation of the gear 11 in the opposite direction, i.e., protraction upon extension of the actuator 13, moves the extension 29 of the spring-loaded yoke 27 into engagement with the offset 41 where contact is maintained intimate under the influence of springs 33. This engagement is nevertheless resilient, i.e., capable of limited relative lateral movement between the shafts 22 and 24, so that precise and machine-type fitting is not required. Moreover, such protraction of the gear 11 and engagement of the complemental offset and extension surfaces serves to actuate the hook 39 in opposition to its normal tendency under the influence of torsion spring 37 rotating it out of engagement with the ramp surfaces 20' of the supporting bearing 20.

It is to be understood that the foregoing disclosure is directed to a specific, preferred embodiment of the invention. Numerous variations and alterations may be made in this embodiment and no doubt will suggest themselves to those skilled in the art without departing from the true spirit and scope of the invention.

What is claimed is:

1. A coupling for rotary shafts comprising:
   an engagement element resiliently mounted on and carried by one of the shafts;
   a surface on said element;
   a complemental surface carried by the other shaft for mating engagement with said element surface when the shafts are axially aligned whereby rotation of either shaft is transmitted to the other shaft;
   a pivotal mounting for at least one of said shafts operable to swing its connected shaft away from the other shaft thereby disengaging said mating surfaces;
   a spring-loaded trigger carried by at least one of said shafts and disposed in the path of movement of the other of said shafts for actuation thereby during the disengagement aforesaid; and
   a cam surface carrried by relatively stationary structure and engageable by said trigger when actuated as aforesaid whereby said one shaft is forcibly moved thereby to a predetermined radial position.

2. The coupling of claim 1 wherein said engagement element includes: a relatively wide laterally disposed base plate secured to one of said shafts; a yoke encircling said base plate and slidably connected at and along its sides thereto; and a compression spring mounted between said base plate and said yoke.

3. The coupling of claim 2 wherein each said trigger is an S-shaped hook pivotally connected medially of its length to said base plate with its opposite ends directed toward the shafts.

4. The coupling of claim 3 wherein said cam surface is formed by sloped surfaces that meet to define a trough adapted to receive one end of said hook.

5. The coupling of claim 4 including an extension on said yoke, said extension carrying said element surface, and a slot in said extension for the passage of the other end of said hook.

References Cited

UNITED STATES PATENTS

| 1,660,569 | 2/1928 | O'Connor | 74—510 |
| 2,331,082 | 10/1943 | Smith | 244—50 |
| 2,756,610 | 7/1956 | Hibbard | 74—470 |

MILTON KAUFMAN, *Primary Examiner.*

U.S. Cl. X.R.

74—470; 244—50